(12) United States Patent
Nakamura (10) Patent No.: US 9,940,096 B2
(45) Date of Patent: Apr. 10, 2018

(54) INFORMATION OUTPUT APPARATUS, INFORMATION OUTPUT METHOD, AND COMPUTER-READABLE MEDIUM (71) Applicant: CASIO COMPUTER CO., LTD., Shibuya-ku, Tokyo (JP)

(72) Inventor: Huminobu Nakamura, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/064,445

(22) Filed: Mar. 8, 2016

(65) Prior Publication Data
US 2016/0283190 A1 Sep. 29, 2016

(30) Foreign Application Priority Data

Mar. 23, 2015 (JP) .................................. 2015-059986

(51) Int. Cl.
*G06F 3/16* (2006.01)
*G06F 3/01* (2006.01)

(52) U.S. Cl.
CPC .............. *G06F 3/167* (2013.01); *G06F 3/016* (2013.01)

(58) Field of Classification Search
CPC ................... G10L 2015/226; G10L 2015/227
See application file for complete search history.

(56) References Cited

U.S. PATENT DOCUMENTS

| 4,635,286 A * | 1/1987 | Bui ........................ G10L 15/00 368/73 |
| 5,444,673 A * | 8/1995 | Mathurin ............... G04G 11/00 368/107 |
| 8,818,814 B2 * | 8/2014 | Yeung .................... G04C 3/002 704/270 |
| 2004/0068409 A1 * | 4/2004 | Tanaka ................... B25J 9/1656 704/272 |
| 2008/0221877 A1 * | 9/2008 | Sumita .................... G10L 15/22 704/211 |
| 2010/0121636 A1 * | 5/2010 | Burke ................... G06F 3/0346 704/233 |

(Continued)

FOREIGN PATENT DOCUMENTS

JP 2002223475 A 8/2002

*Primary Examiner* — Brian L Albertalli
(74) *Attorney, Agent, or Firm* — Holtz, Holtz & Volek PC (57) ABSTRACT

To perform information output suitable for the state of a user. A mobile terminal 1 includes an input unit 17, an output unit 18, a response generation unit 53, a position monitoring unit 52, and an output control unit 54. The input unit 17 receives voice input. The output unit 18 displays information, or outputs information by a method other than screen display. The position monitoring unit 52 detects the position of the mobile terminal 1 at the time of the voice input to the input unit 17. The output control unit 54 controls the output unit 18 to display a response to the voice input generated by the response generation unit 53 in the case where, at the time of the output of the response, the position monitoring unit 52 detects the position at the time of the voice input to the input unit 17, and controls the output unit 18 to output the response to the voice input in the case where, at the time of the output of the response, the position monitoring unit 52 detects a position other than the position at the time of the voice input to the input unit 17.

17 Claims, 5 Drawing Sheets

(56) References Cited

U.S. PATENT DOCUMENTS

| | | | |
|---|---|---|---|
| 2010/0277579 A1* | 11/2010 | Cho | G06K 9/00335 348/61 |
| 2012/0265535 A1* | 10/2012 | Bryant-Rich | H04M 1/7255 704/270 |
| 2014/0303971 A1* | 10/2014 | Yi | H04M 1/605 704/233 |
| 2015/0348548 A1* | 12/2015 | Piernot | G10L 15/22 704/235 |
| 2016/0154624 A1* | 6/2016 | Son | G06F 3/167 704/235 |
| 2016/0188574 A1* | 6/2016 | Homma | G10L 15/1822 704/9 |
| 2016/0260436 A1* | 9/2016 | Lemay | G10L 17/24 |

* cited by examiner

INFORMATION OUTPUT APPARATUS, INFORMATION OUTPUT METHOD, AND COMPUTER-READABLE MEDIUM

CROSS-REFERENCE TO RELATED APPLICATIONS

This application is based upon and claims the benefit of priority under 35 USC 119 of Japanese Patent Application No. 2015-059986 filed on Mar. 23, 2015, the entire disclosure of which, including the description, claims, drawings, and abstract, is incorporated herein by reference in its entirety.

BACKGROUND OF THE INVENTION

1. Field of the Invention

The present invention relates to an information output apparatus, an information output method, and a computer-readable medium.

2. Description of the Related Art

Wrist terminals worn on users' wrists have been conventionally available as described in, for example, Japanese Patent Application Laid-Open No. 2002-223475. Such wrist terminals use a technique of outputting information on screen or by means other than screen, such as sound or vibration, depending on input.

SUMMARY OF THE INVENTION

The present invention is an information output apparatus including: a voice input unit operable to receive voice input; a first output unit operable to display information; a second output unit operable to output information by other than screen display; and a computing device operable to function as units including: a detection unit operable to detect a position of the information output apparatus based on a time of the voice input to the voice input unit; and a control unit operable to control the first output unit or the second output unit to output a response to the voice input, based on the position detected by the detection unit.

The present invention is an information output method executed in an information output apparatus that includes: a voice input unit operable to receive voice input; a first output unit operable to display information; and a second output unit operable to output information by other than screen display, the information output method including: detecting a position of the information output apparatus based on a time of the voice input to the voice input unit; and controlling the first output unit or the second output unit to output a response to the voice input, based on the detected position.

The present invention is a computer-readable medium in which a program is stored, the program causing a computer for controlling an information output apparatus including: a voice input unit operable to receive voice input; a first output unit operable to display information; and a second output unit operable to output information by other than screen display, to function as: a detection unit operable to detect a position of the information output apparatus based on a time of the voice input to the voice input unit; and a control unit operable to control the first output unit or the second output unit to output a response to the voice input, based on the position detected by the detection unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

Figure 1:
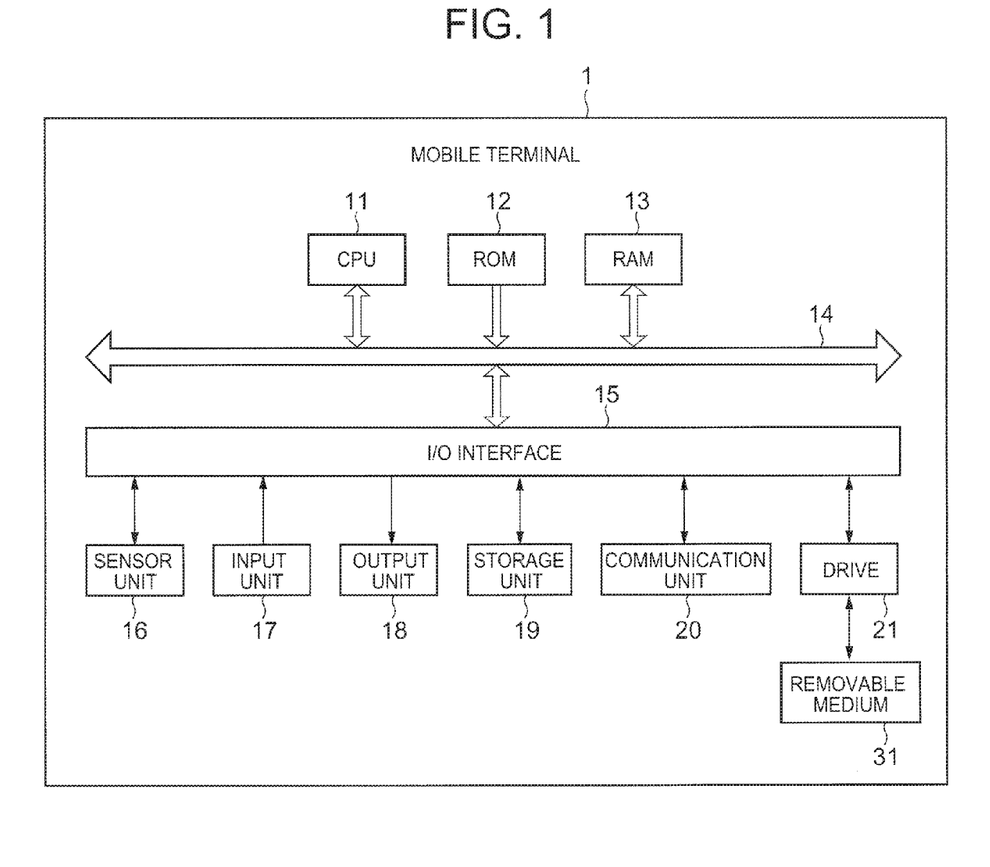
FIG. 1 is a block diagram illustrating the hardware structure of a mobile terminal according to an embodiment of the present invention.

FIG. 1 is a block diagram illustrating the hardware structure of a mobile terminal according to an embodiment of the present invention.

A mobile terminal 1 is, for example, a smartwatch.

The mobile terminal 1 includes a central processing unit (CPU) 11, a read only memory (ROM) 12, a random access memory (RAM) 13, a bus 14, an input/output (I/O) interface 15, a sensor unit 16, an input unit 17, an output unit 18, a storage unit 19, a communication unit 20, and a drive 21.

The CPU 11 executes various processes according to a program stored in the ROM 12 or a program loaded from the storage unit 19 into the RAM 13.

The RAM 13 also stores data and the like necessary for the execution of various processes by the CPU 11, as needed.

The CPU 11, the ROM 12, and the RAM 13 are connected to each other via the bus 14. The I/O interface 15 is also connected to the bus 14. The sensor unit 16, the input unit 17, the output unit 18, the storage unit 19, the communication unit 20, and the drive 21 are connected to the I/O interface 15.

The sensor unit 16 measures changes in state of the apparatus as movements. In this embodiment, the sensor unit 16 includes a three-axis geomagnetic sensor and a three-axis accelerometer.

The three-axis geomagnetic sensor outputs three-axis geomagnetic data representing three axial (X, Y, Z) components of geomagnetism detected using, for example, MI devices that change in impedance depending on the variations of an external magnetic field. The three-axis accelerometer detects three axial components of acceleration by piezoresistance or capacitance detection mechanisms, and outputs acceleration data of the three axial components. The three axial components detected by the three-axis accelerometer correspond to the three axial (X, Y, Z) components of the three-axis geomagnetic sensor.

The input unit 17 includes various buttons and the like, and receives input of various information according to user commands. The input unit 17 also includes a microphone capable of voice input and the like, and enables voice commands.

The output unit 18 includes a display, a speaker, and the like, and outputs images and sounds.

The storage unit 19 includes a hard disk, a dynamic random access memory (DRAM), etc., and stores data of various images.

The communication unit 20 controls communication with another apparatus (not illustrated) via a network such as the Internet.

The drive 21 loads a removable medium 31 such as a magnetic disk, an optical disc, a magneto-optical disc, or a semiconductor memory, as needed. A program read from the removable medium 31 by the drive 21 is installed into the storage unit 19 according to need. The removable medium 31 can also store various data such as image data stored in the storage unit 19, as with the storage unit 19.

The mobile terminal 1 with such a structure has a function of receiving voice input and notifying a response by display or sound/vibration. To perform voice input, the user brings the mobile terminal 1 close to his or her mouth. To view notification on the screen, the user brings the mobile terminal 1 close to his or her face so that the screen is visible.

The mobile terminal 1 in this embodiment detects the position at the time of the voice input. In the case where, when notifying the response, the mobile terminal 1 is in the position at the time of the voice input, the response is displayed on the screen on the ground that the mobile terminal 1 is close to the user's face and the screen is in the visible range. In the case where, when notifying the response, the mobile terminal 1 is not in the position at the time of the voice input, the response is notified not visually but by sound or vibration on the ground that the screen is not visible in the current position. The mobile terminal 1 in this embodiment is a wrist terminal worn on the user's wrist. Accordingly, in the case where the notification is made by sound, the user can hear the sound without moving because the mobile terminal 1 is always located in the range where the sound is audible. In the case where the notification is made by vibration, the user can sense the notification from his or her wrist on which the mobile terminal 1 is worn.

Figure 2A:
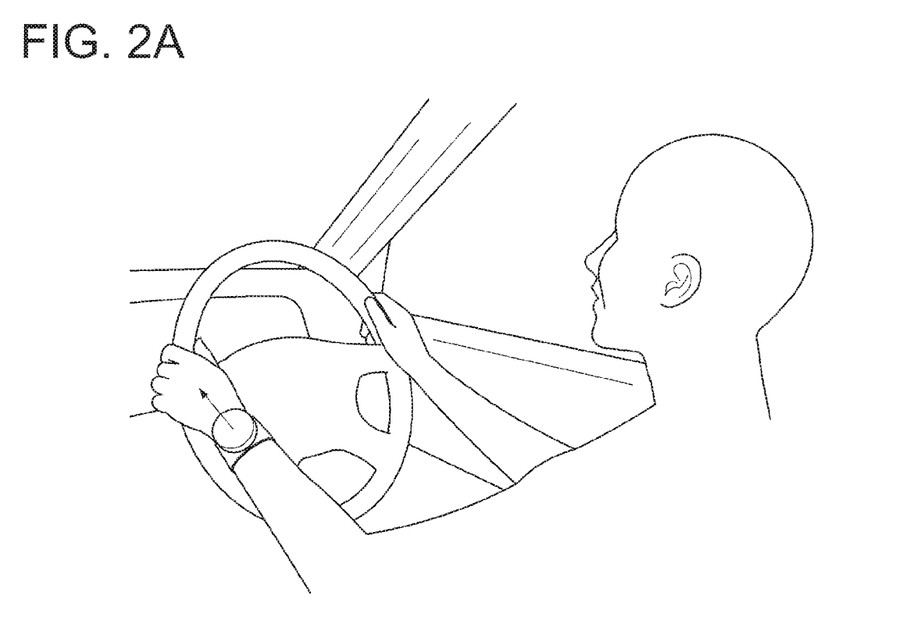
FIGS. 2A and 2B are schematic views illustrating the state of using the mobile terminal in the embodiment.
Figure 2B:
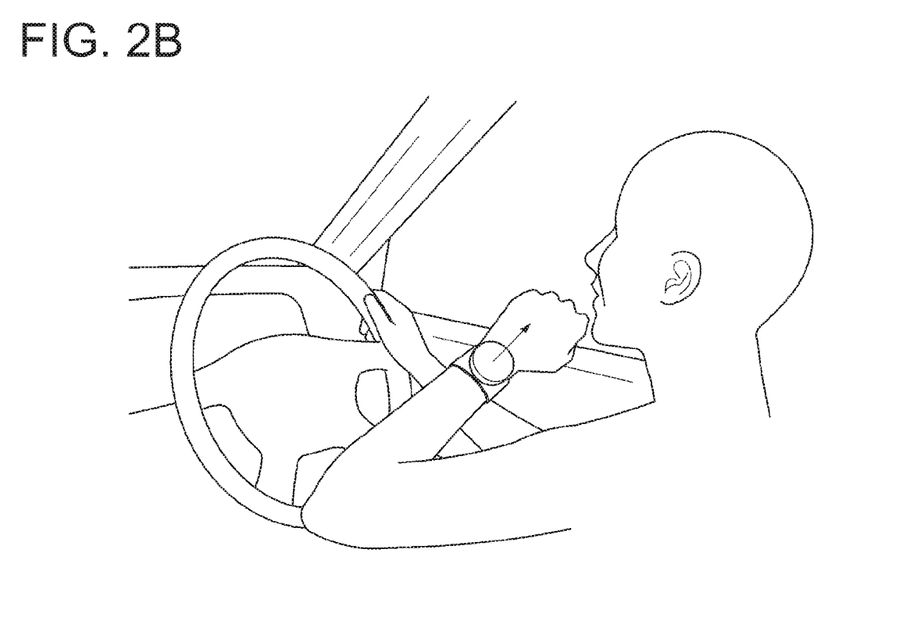
Figure 3A:
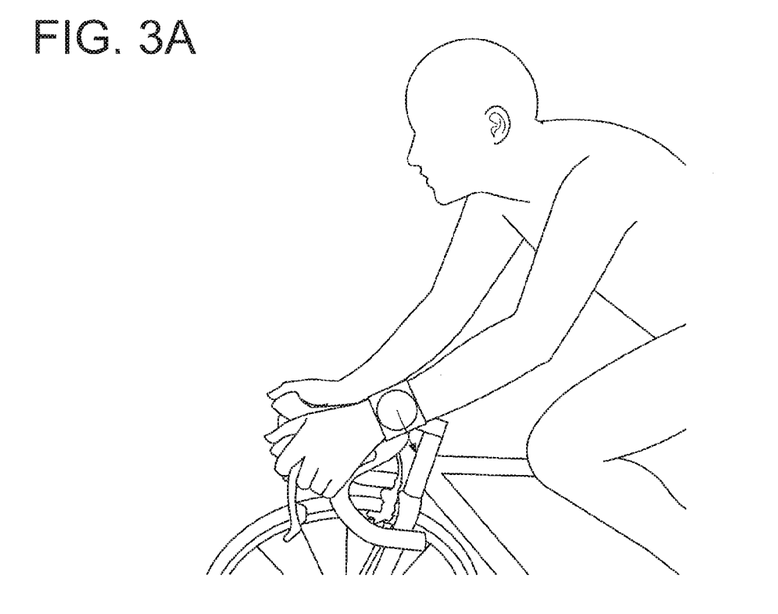
FIGS. 3A and 3B are schematic view illustrating the state of using the mobile terminal in the embodiment.
Figure 3B:
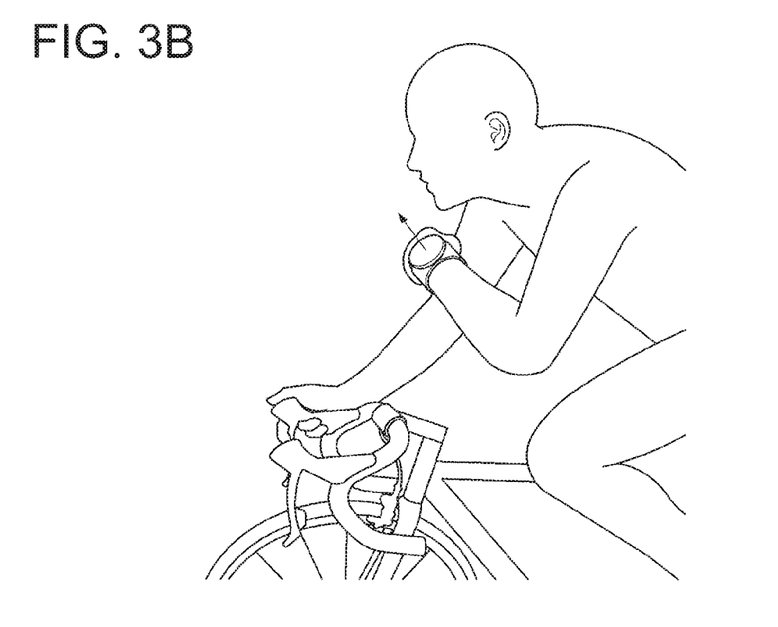

FIGS. 2 and 3 are schematic views each illustrating the state of using the mobile terminal 1 in this embodiment.

As an example, suppose the user wearing the mobile terminal 1 is in a car. During driving, the user is normally steering the car with both hands on the wheel while watching where he or she is driving, as illustrated in FIG. 2A. In this case, the screen is facing in the direction of the arrow, so that the user cannot see the screen squarely.

To perform voice input operation from this state, the user brings the mobile terminal 1 close to his or her mouth and vocally issues a command such as schedule confirmation for input while keeping driving with one hand on the wheel, as illustrated in FIG. 2B. This is a state in which voice input is possible and the user can see the screen squarely as indicated by the arrow.

Thus, in the case where the mobile terminal 1 is close to the user's mouth, the response is notified by screen display because the user can see the screen squarely as indicated by the arrow and the screen is in the visible range.

In the case where the mobile terminal 1 is in the normal position or the like other than close to the user's mouth, on the other hand, the response is notified by sound or vibration because the screen is not facing in the direction in which the user can see the screen and also the screen is not within the distance at which details are visible.

Hence, the user can recognize the notification without changing the driving position in order to view the display, i.e. without being obstructed in his or her driving activity. When the mobile terminal 1 is close to the user's mouth, the screen is visible, and so the user can recognize the notification through screen display which provides a larger amount of information.

As another example, suppose the user is on a bicycle as illustrated in FIGS. 3A and 3B. During riding, the user is steering the bicycle with both hands on the handlebars while watching where he or she is going. In this normal riding state, the screen is not facing in the direction in which the user can see the screen, and also the screen is not within the distance at which details are visible. Hence, the response is notified by screen display when the mobile terminal 1 is close to the user's mouth, and notified by sound or vibration when the mobile terminal 1 is in the normal position or the like other than close to the user's mouth.

Figure 4:
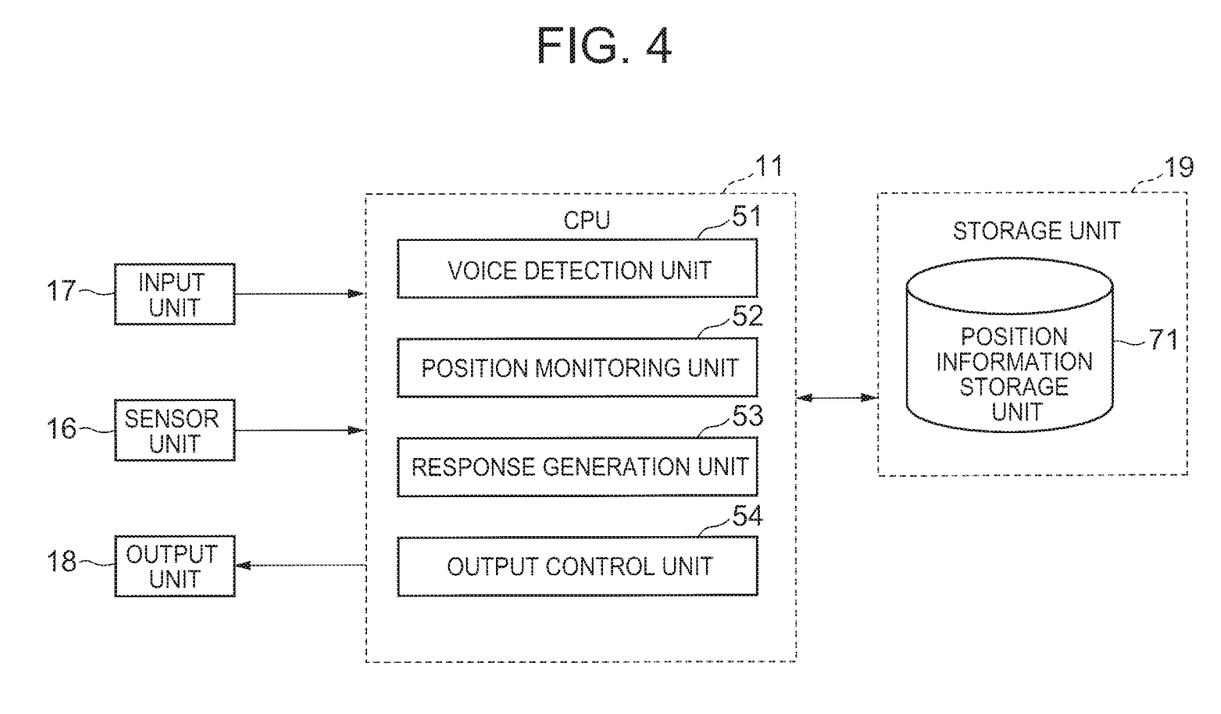
FIG. 4 is a functional block diagram illustrating part of the functional structure of the mobile terminal in FIG. 1 for executing a response determination process.

FIG. 4 is a functional block diagram illustrating part of the functional structure of the mobile terminal 1 for executing a response determination process.

The response determination process is a series of processes for notifying the result of voice input by a method that differs depending on the position at the time of notification.

In the case of executing the response determination process, the CPU 11 functions as a voice detection unit 51, a position monitoring unit 52, a response generation unit 53, and an output control unit 54 as illustrated in FIG. 4.

Moreover, a position information storage unit 71 is set in one area of the storage unit 19.

The position information storage unit 71 stores position information at the time of voice input. The position information at the time of voice input is the sensor value of the sensor unit 16 when the mobile terminal 1 is close to the user's mouth as the position at the time of voice input.

The voice detection unit 51 detects voice input to the input unit 17.

The position monitoring unit 52 stores the position of the apparatus at the time of the voice input (close to the user's mouth in this embodiment), in the position information storage unit 71.

The position monitoring unit 52 also determines the position of the apparatus when outputting the response to the voice. In detail, the position monitoring unit 52 determines whether or not the position of the apparatus at the time of the output of the response to the voice is the position of the apparatus at the time of the voice input (close to the user's mouth in this embodiment).

The response generation unit 53 generates the response to the voice detected by the voice detection unit 51. In detail, for example in the case where voice input for schedule confirmation is detected, the response generation unit 53 acquires information of whether or not the user has a schedule and the details of the schedule, and generates the response.

The output control unit 54 controls the output unit 18 to perform display output, sound output, or vibration output. In detail, in the case where, at the time of the output, the mobile terminal 1 is in the position at the time of the voice input, the output control unit 54 controls the output unit 18 to display the schedule information. In the case where, at the time of the output, the mobile terminal 1 is not in the position at the time of the voice input, the output control unit 54 controls the output unit 18 to notify whether or not the user has a schedule by sound/vibration as the mobile terminal 1 is not in the position where the display screen is visible.

Figure 5:
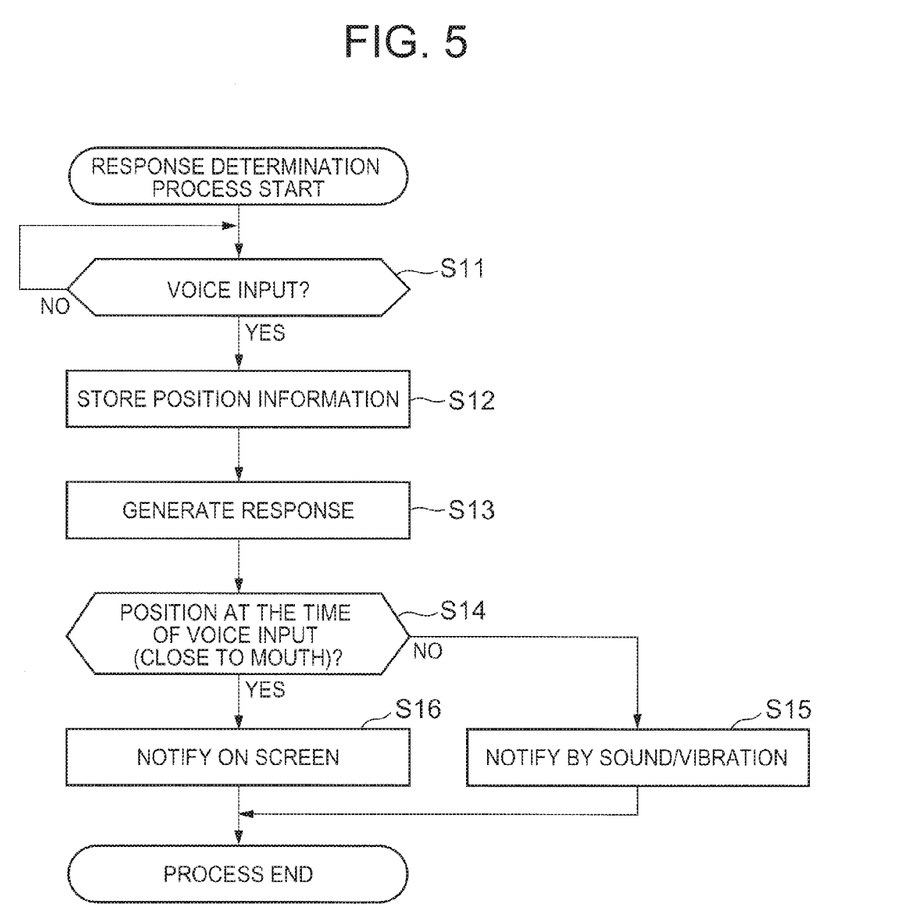
FIG. 5 is a flowchart illustrating the response determination process executed by the mobile terminal in FIG. 1 having the functional structure in FIG. 4.

FIG. 5 is a flowchart illustrating the response determination process executed by the mobile terminal 1 in FIG. 1 having the functional structure in FIG. 4.

The response determination process starts when the user performs response determination process start operation on the input unit 17.

In step S11, the voice detection unit 51 determines whether or not there is voice input.

In the case where there is no voice input, step S11 results in NO and the mobile terminal 1 is on standby.

In the case where there is voice input, step S11 results in YES and the process advances to step S12.

In step S12, the position monitoring unit 52 stores the position in the position information storage unit 71.

In step S13, the response generation unit 53 generates the response to the input detected by the voice detection unit 51. For example, in the case where the input detected by the voice detection unit 51 is the confirmation of a preset schedule, the response generation unit 53 acquires information of whether or not the user has a schedule and the details of the schedule, and generates the response.

In step S14, the position monitoring unit 52 determines whether or not the mobile terminal 1 is in the position at the time of the voice input. In the case where the mobile terminal 1 is not in the position at the time of the voice input, step S14 results in NO and the process advances to step S15.

In step S15, the output control unit 54 outputs the result of voice input by sound or vibration, given that the mobile terminal 1 is not in the position at the time of the voice input and the screen of the output unit 18 is not visible (the state in FIG. 2A or FIG. 3A). This allows the user to recognize the result of voice input with no need to move. The response determination process then ends.

In the case where the mobile terminal 1 is in the position at the time of the voice input, step S14 results in YES and the process advances to step S16.

In step S16, the output control unit 54 outputs the result of voice input on the screen of the output unit 18, given that the mobile terminal 1 is in the position at the time of the voice input and the screen of the output unit 18 is visible (the state in FIG. 2B or FIG. 3B). This allows the user to view the screen and recognize the notification. The response determination process then ends.

The above-mentioned wrist mobile terminal 1 uses screen display, sound, vibration, etc. as a user interface (UI) for conveying information to the user. When the user operates such a wrist terminal while driving a car, a UI that requires the user to view the screen is not preferable because his or her driving may be affected. Notifying the user only by vibration or sound, however, is disadvantageous because rich information satisfactory to the user cannot be provided.

Accordingly, the mobile terminal 1 in this embodiment constantly monitors changes in position based on information from the sensor unit 16 such as an accelerometer and a gyroscope. When the mobile terminal 1 is in a specific position (the position at the time of input operation, i.e. close to the mouth), the mobile terminal 1 determines that the user can afford to view the screen, and notifies the user of the command execution result in response to the voice input in detail by screen display. When the mobile terminal 1 is not in the specific position, the mobile terminal 1 determines that the user cannot afford to view the screen as, for example, the user is driving a car and needs to keep his or her hands on the wheel, and notifies the user of the command execution result in response to the voice input simply by sound or vibration.

With this structure, the mobile terminal 1 can make notification suitable for the state of the user. As compared with the case where information is provided invariably by sound or vibration regardless of the situation, the most suitable method can be automatically selected to provide information depending on the state of the user.

The mobile terminal 1 having the structure described above includes the input unit 17, the output unit 18, the response generation unit 53, the position monitoring unit 52, and the output control unit 54.

The input unit 17 receives voice input.

The output unit 18 displays information, or outputs information by a method other than screen display.

The response generation unit 53 generates a response to the voice input to the input unit 17.

The position monitoring unit 52 detects the position of the mobile terminal 1 at the time of the voice input to the input unit 17.

The output control unit 54 controls the output unit 18 to display the response to the voice input generated by the response generation unit 53 in the case where, at the time of the output of the response to the voice input, the position monitoring unit 52 detects the position at the time of the voice input to the input unit 17, and controls the output unit 18 to output the response to the voice input in the case where, at the time of the output of the response to the voice input, the position monitoring unit 52 detects a position other than the position at the time of the voice input to the input unit 17.

Thus, the mobile terminal 1 outputs information by screen display when the user is able to view the screen, and outputs information by sound or vibration when the user is not able to view the screen. Since information is output in a manner suitable for the state of the user, the user can reliably obtain desired information and also obtain a necessary amount of information. When the user is concentrating on another activity, an output method that provides a large amount of information (screen display) is not used, so that the user can safely perform the activity without his or her concentration being disturbed and also reliably obtain information.

Here, the position is determined based on the position at the time of the voice input. Since screen display is ensured with the same movement, the user can easily learn the position in which the mobile terminal 1 provides screen display. Moreover, in terms of the apparatus design, the position can be specified while taking into account the characteristics of each individual user's posture, with it being possible to enhance the position detection accuracy.

The position monitoring unit 52 further detects the position before the voice input to the input unit 17.

The output control unit 54 controls the output unit 18 to output the response to the voice input by means other than screen display, such as vibration or sound, in the case where, at the time of the output of the response to the voice input, the position monitoring unit 52 detects the position before the voice input.

Thus, the mobile terminal 1 outputs information by sound or vibration in the case where the position monitoring unit 52 detects the position before the voice input. This enables information output suitable for the state of the user.

The output unit 18 outputs the response to the voice input by sound or vibration.

The mobile terminal 1 thus ensures that the user senses the output result even when he or she is engaged in another activity.

The input unit 17 has the voice input part near the output unit 18, and voice can be input by performing input operation near the user's mouth.

The position monitoring unit 52 detects the position close to the user's mouth, as the position at the time of the voice input to the input unit 17.

The mobile terminal 1 thus enables the user to easily view the screen display.

The position monitoring unit 52 detects the position at the time of the voice input to the voice input unit, based on information from the sensor unit 16 that senses the position of the apparatus.

The mobile terminal 1 can thus detect the position with high accuracy.

The mobile terminal 1 is a wrist terminal worn on the user's wrist.

The mobile terminal 1 thus ensures that the user recognizes information even when he or she is engaged in another activity.

The present invention is not limited to the foregoing embodiment, and includes changes and modifications as long as the object of the present invention is achieved.

Although the foregoing embodiment describes the case where the output method is changed based on, as the specific position, the position when performing the input operation, i.e. the position close to the mouth, the output method may be changed between, for example, the position change state in which the mobile terminal 1 moves from a reference position to close to the mouth before the voice input and returns to the reference position after the voice input and the position change state in which the mobile terminal 1 moves from the reference position to close to the mouth before the voice input and does not return to the reference position and remains close to the mouth after the voice input.

In detail, in the case of "(the user's hands on the wheel)→(the terminal brought close to the user's mouth)→(the user's hands on the wheel)", the command execution result in response to the voice input is notified by sound or vibration. In the case of "(the user's hands on the wheel)→(the terminal brought close to the user's mouth)→(the terminal remaining close to the user's mouth)", the command execution result in response to the voice input is notified by screen display.

Alternatively, the output method may be changed depending on whether or not there is a position change before and after the voice input.

In detail, in the case of "(the user's hands on the wheel)→(the user inputting voice with his or her hands on the wheel)→(the user's hands on the wheel)", the user is determined to be unable to view the screen and the command execution result in response to the voice input is notified by sound or vibration. In the case of "(the user's hands on the wheel)→(the user inputting voice with his or her hands on the wheel)→(a position other than the user's hands on the wheel)", the user is determined to have changed his or her position to be able to view the screen and the command execution result in response to the voice input is notified by screen display.

Although the foregoing embodiment describes an example when the user drives a car or rides a bicycle, this is not a limitation. The present invention is also applicable in the case where the user operates the apparatus while engaged in another conscious activity such as walking.

Although the foregoing embodiment describes the case where the position of the apparatus when performing input operation is set as the state in which the screen is visible and distinguished from the other positions, this is not a limitation as long as the position of the apparatus in which the screen is visible is detected. For example, whether or not the position matches a pre-registered apparatus position in which the screen is visible may be determined.

Although the foregoing embodiment describes the case where the sensor unit 16 detects the position of the apparatus to specify the state in which the screen is visible, this is not a limitation as long as the state in which the screen is visible is specified. For example, the apparatus may be provided with an imaging unit so that a captured image is analyzed to specify the state in which the screen is visible.

Although the foregoing embodiment describes a smartwatch as an example of the mobile terminal 1 to which the present invention is applied, the present invention is not particularly limited to such.

For example, the present invention is applicable to electronics in general which are capable of the response determination process. In detail, the present invention is applicable to a notebook personal computer, a printer, a television receiver, a video camera, a portable navigation device, a mobile phone, a digital camera, a smartphone, a portable game machine, etc.

The series of processes described above may be executed by hardware or by software.

In other words, the functional structure in FIG. 4 is merely illustrative, and does not particularly limit the present invention. As long as the mobile terminal 1 has functions for executing the series of processes as a whole, which functional blocks are used to realize such functions is not particularly limited to the example in FIG. 4.

Furthermore, one functional block may be realized by hardware alone, by software alone, or by a combination of hardware and software.

In the case where the series of processes is executed by software, a program constituting the software is installed from a network or a recording medium into a computer or the like.

The computer may be a computer incorporated in dedicated hardware. The computer may be a computer capable of various functions when installed with various programs, such as a general-purpose personal computer.

A recording medium including such a program may be realized not only by the removable medium 31 in FIG. 1 which is distributed separately from the apparatus to provide the program to the user, but also by, for example, a recording medium provided to the user in the state of being incorporated in the apparatus beforehand. The removable medium 31 is, for example, a magnetic disk (such as a floppy disk), an optical disc, or a magneto-optical disc. Examples of the optical disc include a compact disc read-only memory (CD-ROM), a digital versatile disc (DVD), and a Blu-ray® disc. Examples of the magneto-optical disc include a mini disc (MD). The recording medium provided to the user in the state of being incorporated in the apparatus beforehand is, for example, the ROM 12 in FIG. 1 in which the program is stored or a hard disk included in the storage unit 19 in FIG. 1.

In this specification, the steps included in the program stored in the recording medium may include not only processes executed in time series but also processes not executed in time series but executed in parallel or separately.

While some embodiments of the present invention have been described above, these embodiments are merely illustrative and do not limit the technical scope of the present invention. Various other embodiments of the present invention are possible, and changes such as omission and replacement may be made without departing from the scope of the present invention. These embodiments and modifications are included in the scope of the invention described in this specification as an example and also included in the scope of the invention described in the claims and its equivalent scope.

What is claimed is:

1. An information output apparatus comprising:
   a memory;
   a voice input unit operable to receive voice input;
   a first output unit operable to display information;
   a second output unit operable to output information by other than screen display; and
   a computing device operable to perform functions comprising:
   detecting a position of the information output apparatus at a time when the voice input unit receives the voice input;
   storing, in the memory, the detected position of the information output apparatus at the time when the voice input unit receives the voice input;
   detecting a position of the information output apparatus at a time to output a response to the voice input;
   judging whether the position of the information output apparatus at the time to output the response to the voice input is the same as the stored position of the information output apparatus at the time when the voice input unit received the voice input; and
   selectively controlling one of the first output unit and the second output unit to output the response to the voice input, based on a result of the judging.

2. The information output apparatus according to claim 1, wherein the computing device selectively controls the first output unit to display the response to the voice input in a case in which the position of the information output apparatus at the time to output the response to the voice input is the same as the position of the information output apparatus at the time when the voice input unit received the voice input, and
   wherein the computing device selectively controls the second output unit to output the response to the voice input in a case in which the position of the information output unit at the time to output the response to the voice input is different from the position of the information output apparatus at the time when the voice input unit received the voice input.

3. The information output apparatus according to claim 1, wherein the computing device is further operable to perform functions comprising:
   detecting the position of the information output apparatus before the voice input unit receives the voice input;
   judging whether the position of the information output apparatus at the time to output the response to the voice input is the same as the position of the information output apparatus before the voice input unit received the voice input; and
   selectively controlling the second output unit to output the response to the voice input in a case in which the position of the information output apparatus at the time to output the response to the voice input is the same as the position of the information output apparatus before the voice input.

4. The information output apparatus according to claim 1, wherein the computing device is further operable to detect the position of the information output apparatus before and after the voice input unit receives the voice input,
   wherein the computing device selectively controls the first output unit to display the response to the voice input in a case in which the position of the information output apparatus changes before and after the voice input to the voice input unit, and
   wherein the computing device selectively controls the second output unit to output the response to the voice input in a case in which the position of the information output apparatus does not change before and after the voice input to the voice input unit.

5. The information output apparatus according to claim 1, wherein the second output unit is operable to output the response to the voice input by sound or vibration.

6. The information output apparatus according to claim 1, which is a wrist terminal configured to be worn on a user's wrist.

7. An information output method executed in an information output apparatus that includes: a memory; a voice input unit operable to receive voice input; a first output unit operable to display information; and a second output unit operable to output information by other than screen display, the information output method comprising:
   detecting a position of the information output apparatus at a time when the voice input unit receives the voice input;
   storing, in the memory, the detected position of the information output apparatus at the time when the voice input unit receives the voice input;
   detecting a position of the information output apparatus at a time to output a response to the voice input;
   judging whether the position of the information output apparatus at the time to output the response to the voice input is the same as the stored position of the information output apparatus at the time when the voice input unit received the voice input; and
   selectively controlling one of the first output unit and the second output unit to output the response to the voice input, based on a result of the judging.

8. The information output method according to claim 7, wherein the controlling comprises:
   selectively controlling the first output unit to display the response to the voice input in a case in which the position of the information output apparatus at the time to output the response to the voice input is the same as the position of the information output apparatus at the time when the voice input unit received the voice input; and
   selectively controlling the second output unit to output the response to the voice input in a case in which the position of the information output apparatus at the time to output the response to the voice input is different from the position of the information output apparatus at the time when the voice input unit received the voice input.

9. The information output method according to claim 7, further comprising:
   detecting the position of the information output apparatus before the voice input unit receives the voice input;
   judging whether the position of the information output apparatus at the time to output the response to the voice input is the same as the position of the information output apparatus before the voice input unit received the voice input; and
   selectively controlling the second output unit to output the response to the voice input in a case in which the position of the information output apparatus at the time to output the response to the voice input is the same as the position of the information output apparatus before the voice input is detected.

10. The information output method according to claim 7, further comprising:
    detecting the position of the information output apparatus before and after the voice input unit receives the voice input; and selectively controlling the first output unit to display the response to the voice input in a case in which the detected position of the information output apparatus changes before and after the voice input to the voice input unit; and selectively controlling the second output unit to output the response to the voice input in a case in which the detected position of the information output apparatus does not change before and after the voice input to the voice input unit.

11. The information output method according to claim 7, wherein the second output unit is operable to output the response to the voice input by sound or vibration.

12. The information output method according to claim 7, wherein the information output apparatus is a wrist terminal configured to be worn on a user's wrist.

13. A non-transitory computer-readable medium in which a program is stored, the program causing a computer for controlling an information output apparatus including: a memory; a voice input unit operable to receive voice input; a first output unit operable to display information; and a second output unit operable to output information by other than screen display, to perform functions comprising:
    detecting a position of the information output apparatus at a time when the voice input unit receives the voice input;
    storing, in the memory, the detected position of the information output apparatus at the time when the voice input unit receives the voice input;
    detecting a position of the information output apparatus at a time to output a response to the voice input;
    judging whether the position of the information output apparatus at the time to output the response to the voice input is the same as the stored position of the information output apparatus at the time when the voice input unit received the voice input; and
    selectively controlling one of the first output unit and the second output unit to output the response to the voice input, based on a result of the judging.

14. The computer-readable medium according to claim 13, wherein the controlling comprises:
    selectively controlling the first output unit to display the response to the voice input in a case in which the position of the information output apparatus at the time to output the response to the voice input is the same as the position of the information output apparatus at the time when the voice input unit received the voice input; and
    selectively controlling the second output unit to output the response to the voice input in a case in which the position of the information output unit at the time to output the response to the voice input is different from the position of the information output apparatus at the time when the voice input unit received the voice input.

15. The computer-readable medium according to claim 13, wherein the functions further comprise:
    detecting the position of the information output apparatus before the voice input unit receives the voice input;
    judging whether the position of the information output apparatus at the time to output the response to the voice input is the same as the position of the information output apparatus before the voice input unit received the voice input; and
    selectively controlling the second output unit to output the response to the voice input in a case in which the position of the information output apparatus at the time to output the response to the voice input is the same as the position of the information output apparatus before the voice input.

16. The computer-readable medium according to claim 13, wherein the functions further comprise detecting the position of the information output apparatus before and after the voice input unit receives the voice input, and
    wherein the controlling comprises:
    selectively controlling the first output unit to display the response to the voice input in a case in which the position of the information output apparatus changes before and after the voice input to the voice input unit; and
    selectively controlling the second output unit to output the response to the voice input in a case in which the position of the information output apparatus does not change before and after the voice input to the voice input unit.

17. The computer-readable medium according to claim 13, wherein the second output unit is operable to output the response to the voice input by sound or vibration.

* * * * *